United States Patent [19]
Raychaudhuri et al.

[11] Patent Number: 4,841,527
[45] Date of Patent: Jun. 20, 1989

[54] STABILIZATION OF RANDOM ACCESS PACKET CDMA NETWORKS

[75] Inventors: Dipankar Raychaudhuri, Kendall Park; Kuriacose Joseph, Plainsboro, both of N.J.

[73] Assignee: General Electric Company, Schenectady, N.Y.

[21] Appl. No.: 121,423

[22] Filed: Nov. 16, 1987

[51] Int. Cl.$^4$ .................... G08C 25/02; G06F 11/14
[52] U.S. Cl. ..................................................... 371/32
[58] Field of Search ................................. 371/32, 33

[56] References Cited

U.S. PATENT DOCUMENTS

| | | | |
|---|---|---|---|
| 4,074,232 | 2/1978 | Otomo et al. | 371/32 X |
| 4,237,338 | 12/1980 | Hecht | 371/32 X |
| 4,479,215 | 10/1984 | Baker | 371/33 |
| 4,622,682 | 11/1986 | Kumakura | 371/32 X |
| 4,646,300 | 2/1987 | Goodman et al. | 371/33 |
| 4,726,027 | 2/1988 | Nakamura et al. | 371/32 |

OTHER PUBLICATIONS

N. Abramson, "The ALHOA System-Another Alternative for Computer Communication", Proc. AFIPS, 1970 Fall Joint Comput. Conf. vol. 37, pp. 280-285.
A. Carlieal & M. Hellman, "Bistable Behaviour of ALHOA-type Systems", IEEE Trans. on Comm., Apr. 1975, pp. 401-410.
L. Klienrock & S. S. Lam, "Packet Switching in a Multiaccess Broadcast Channel-Dynamic Control Procedures", IEEE Trans. on Comm., Sept. 1975, pp. 410-423.
Y. C. Jenq, "Optimal Retransmission Control of Slotted ALOHA Systems", IEEE Trans. on Comm., Jun. 1981, pp. 891-895.
D. Raychaudhuri, "Performance Analysis of Random Access Packet Switched Code Division Multiple Access Systems", IEEE Trans. on Comm., Jun. 1981, pp. 895-901.
J. Musser & J. Daigle, "Throughput Analysis of an Asynchronous Code Division Multiple Access (CDMA) System", Proc. ICC 1982, Phila., Jun. 1982, pp. 2F2. 1-7.

*Primary Examiner*—Charles E. Atkinson
*Attorney, Agent, or Firm*—William Squire; James C. Davis, Jr.; Paul R. Webb, II

[57] ABSTRACT

A CDMA network includes a retransmission scheduler which selectively delays the retransmission of an initially erroneously sent signal. The selected delays have an average value in a range of values which results in a single equilibrium point between input messages and output messages to avoid a bistable condition that can lower overall system throughput.

6 Claims, 5 Drawing Sheets

STABILIZATION OF RANDOM ACCESS PACKET CDMA NETWORKS

BACKGROUND OF THE INVENTION

The present invention relates to data networks, and more particularly to code division multiple access (CDMA) networks.

In CDMA networks, a message is asynchronously transmitted as a plurality of code bits, typically several hundred to about one thousand, wherein the code bits include an information portion which contains a coded message and a header description portion containing codes indicating the terminals destined to receive the message. The large number of code bits requires a large bandwidth channel to maintain a reasonable data rate, while only a few terminals can use the channel if collisions between contending terminals are to be avoided. The requirements for a large bandwidth and few terminals in turn results in a low channel efficiency. CDMA (also known as spread spectrum multiple access, SSMA) has been utilized as a technique for asynchronous multipoint to multipoint communication in the presence of specular interference, jamming, etc. Until recently, CDMA was used mainly for military applications in which operational advantages due to spread spectrum coding take precedence over transmission efficiency. In the past few years, commercial application of CDMA has been increasing because it offers the possibility of interconnecting small earth stations or mobile terminals without timing synchronization, even in the presence of terrestrial interference.

Until recently, most CDMA systems were designed for quasi-continuous operation, in which each station is allocated a fixed fraction of channel resource and is assumed to operate nearly continuously. However, in many emerging applications, the individual demand for each terminal, such as in a point-of-sale terminal, is small and occurs in bursts so that operation of a packet network, in which resource use is proportional to station demands, becomes appropriate. In an "ALOHA" type system, erroneously received data packets are retransmitted with a random time delay. Consideration of CDMA packet networks for broadcast channels, including satellite and ground radio, leads to the conclusion that CDMA or random access type operation is preferred since CDMA reduces the probability of destructive interference due to multiuser transmissions. Since in CDMA, multiple transmissions can co-exist on the same channel without necessarily colliding, the throughput-delay characteristics will be different from conventional ALOHA, which does not use spread spectrum techniques.

A problem with current CDMA techniques is that spread spectrum coding generally requires a large expansion in bandwidth, so that net channel utilization is relatively low compared with unspread multiaccess methods. In order to achieve relatively high channel utilization, CDMA systems must be operated with a high channel traffic load. However, owing to the nature of random access (in which no control is exercised on the stations transmitting) unstable operation of the channel may result from too many transmissions being made in too short a time. Such an unstable operation implies that a backlogged retransmission mode has undesirably become a steady-state condition, which should be avoided. This is because the random access implied in CDMA systems result in traffic-dependent packet collisions with the unaltered retransmissions.

A practical CDMA system to be useful must incorporate a suitable mechanism to prevent such instability from occurring. Random access CDMA with fixed length packets and time slotting on the channel was discussed and analyzed in terms of throughput delay and stability by the present inventor in a paper entitled "Performance Analysis of Random Access Packet Switched Code Television Multiple Access Systems; IEEE Transactions on Communications, June 1981, pp. 895–901. However, a large proportion of practical CDMA Systems operate asynchronously. The prior art has not dealt with understanding the nature of the instability present in a general class of asynchronous random access SSMA packet networks with variable length message traffic. The present invention recognizes a need for understanding the nature of such instability and the need for a way to prevent such instability from occurring.

According to the present invention, a method for transmitting information comprises initially transmitting information in a code division multiple access channel. A procedure is then followed wherein a determination is made to see if the information has been correctly received at the transmitter and by inference, by other receivers, and, if not, the information is retransmitted with a selected time delay. This procedure is repeated using a different time delay each time until the information is determined to be correctly received. Time delays are selected at random but are selected to have an average value in accordance with the occupancy of the channel to provide a single stability mode to the system. The determination of whether these hasten correct reception may be inferred by the sending terminal based on it receiving back its own prior transmission free from collision.

Figure 5:
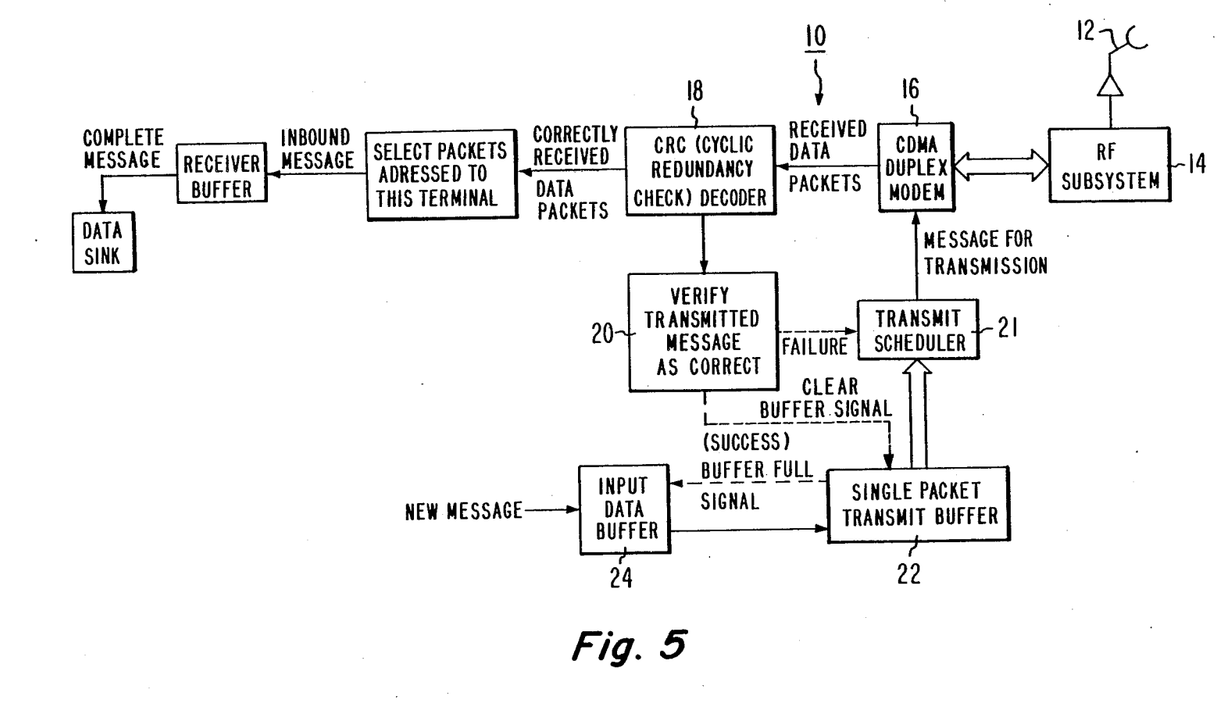
FIG. 5 is a block diagram of a system in accordance with one embodiment of the present invention.
Figure 6:
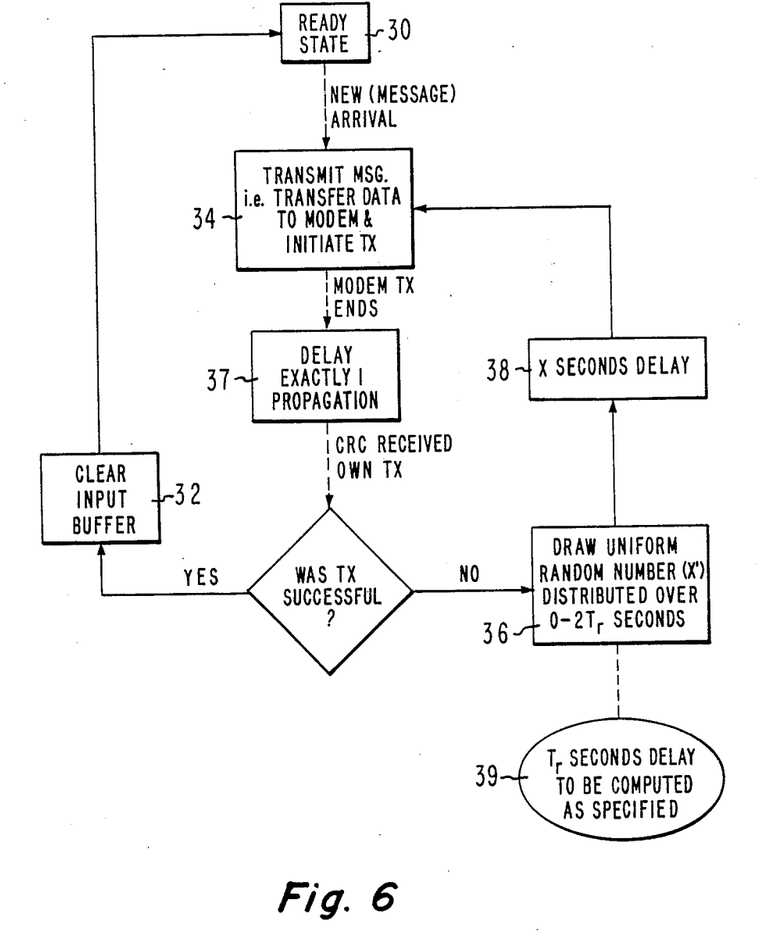
FIG. 6 is a flow chart illustrating the operation of the transmit scheduler of the diagram of FIG. 5.

FIGS. 5 and 6 together illustrate a solution to the problem of instability in an asynchronous CDMA packet communication system. However, the difficulty in arriving at the system of FIGS. 5 and 6 lies not in the system per se but in understanding the nature of the problem of instability in the asynchronous CDMA channel. Asynchronous CDMA channels are not generally understood to have instability problems. Therefore, it is believed that a thorough understanding of the nature of the problem relating to instability in such a CDMA channel is essential to understanding the solution presented in FIGS. 5 and 6. To understand the nature of the problem of asynchronous random access SSMA packet networks (CDMA) with variable length message traffic, a traffic model is developed and analyzed. After the model is presented and the analysis given by way of specific numerical examples, the solution to the instability problem will then be described in detail in connection with FIGS. 5 and 6.

The traffic model is analogous to the finite user interactive terminal model commonly used in the analysis of random access systems. The modeled system is closed with N interactive terminals, which are normally in the "ready" state during which new messages are generated at an effective (Poisson) rate $\lambda_a$ messages/sec. In the unslotted random access CDMA protocol, transmission of a new message occurs asynchronously at the instant it is generated by a ready terminal. An unsuccessful new transmission due to either thermal noise or multiuser interference causes the terminal to enter its retransmission or "backlogged" mode. In the backlogged mode, retransmission of the unsuccessful message is attempted with a random delay, which delays average $T_r$ sec, which is assumed equivalent to a Poisson rate of $\lambda_r$ messages/sec. A terminal remains in the retransmission mode until the message is successfully transmitted, and new message generation is inhibited during this period. The effective retransmission rate $\lambda_r$ used is typically higher than the new message generation rate $\lambda_a$, in order to minimize the contention delay experienced by terminals. However, the desire to use as large a $\lambda_r$ as possible is counterbalanced by the possibility of instability. Specifically, if $\lambda_r$ is too high, the random access system may undesirably reach stable equilibrium in conditions of high backlog and delay, due to an overload of the channel with retransmission traffic.

In a variable message length system, the additional dimension of message length must be incorporated in the analysis. The term $a(\tau)$ is defined as the length distribution of new messages. However, since long messages generally experience a higher probability of packet error than short ones, the length distribution of the overall traffic entering the channel has a traffic dependent distribution $b(\tau)$. The total offered traffic G on the channel is therefore equal to $\lambda \overline{B}$, where $\lambda$ is the composite message arrival rate and $\overline{B}$ is the average composite message length. These traffic parameter definitions are shown schematically in FIG. 1.

Figure 1:
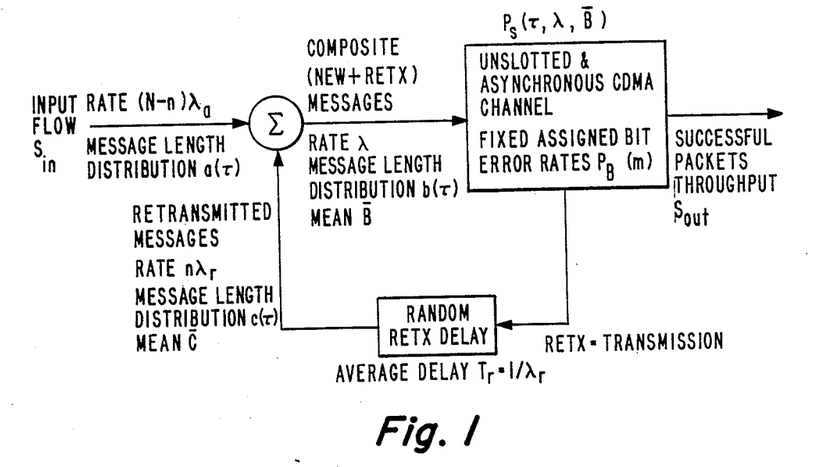
FIG. 1 is a schematic diagram characterizing a CDMA channel by a conditional packet success probability employed in analyzing the stability of a CDMA channel.

In FIG. 1, the CDMA channel is characterized by a conditional packet success probability $P_S(\tau, \lambda, G)$, which is defined as the probability that a $\tau$ sec long (equivalent to $L = \tau R$ bits, with unspread data rate R bps) packet when transmitted on the CDMA channel operating with total channel traffic volume G and overall (new and retransmitted) arrival rate $\lambda$, will be successfully received. Stability analysis requires the above conditional packet success probability function, which is dependent on a number of factors including CDMA code properties and terminal message length distribution. Maximum generality with respect to CDMA code properties is maintained by describing the spread spectrum system in terms of its "fixed assigned" error performance. Specifically, the present analysis is applicable to uncoded packet implementations of any spread spectrum system for which the fixed assigned bit error probability function $P_B(m)$ (with m equal to the number of simultaneous channel transmissions) can be determined. This static multiuser performance characterization is generally available in the literature.

Figure 2:
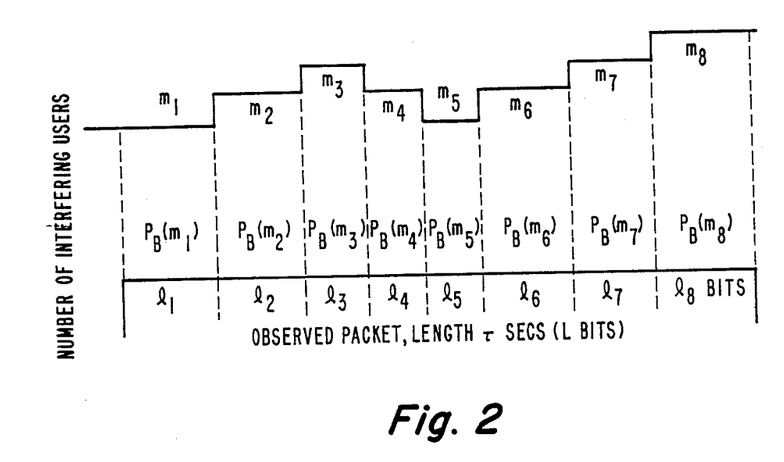
FIG. 2 is a diagram illustrating the relationship of the number of interferring users to the observed packet length at different portions of a given packet.

The first step is to determine the conditional packet success probability function $P_S$ in terms of $\tau$ (message length), $\lambda$ (message rate), and G (total traffic volume) for specified new message length distribution $a(\tau)$ and static CDMA function $P_B(m) \triangleq 1 - P_c(m)$, (where $P_c(m)$ is the corresponding correct probability). FIG. 2 shows the typical evolution of the multiuser interference experienced by a packet of specified length $\tau$ secs in an asynchronous random access CDMA system. As shown, unslotted operation results in randomly varying multiuser interference. Specifically, the bit error rate varies in a correlated manner over the duration of a packet, resulting in potentially different error rates on each of the L bits. Determination of the packet success probability, which in general, involves knowledge of the joint density function of the interference process observed at each of the L bits in a packet, is an analytically difficult task.

The analysis becomes feasible if it is assumed that for exponential new message length distribution (i.e. $a(\tau) = (1/A) \exp(-\tau/A)$, the composite message length distribution $b(\tau)$ is also exponential ($b(\tau) = (1/B) \exp(-\tau/B)$, with $B = G/\tau$. This type of exponential assumption is generally required for tractability in the analysis of variable message length random access, and has been used by others. With this assumption, the stochastic process describing the interference becomes Markovian, since the composite message input process is Poisson, and the message transmission time is exponentially distributed. The Markovian property of the multiuser interference is the key to efficient calculation of the conditional packet success probability function.

In an L bit packet, $m_i$ is the number of interfering users during the i-th bit, where $i = 1, 2, \ldots L$. The above discrete time characterization implicitly assumes that the multiuser interference changes slowly relative to a bit duration ($\Delta t$ sec), as might be expected in reality. Although the present calculation is based on a Poisson input traffic process of rate $\lambda$, the problem can be treated in a discrete space $m_i \epsilon (1, M)$ with little loss in accuracy, provided M is chosen to be large enough (i.e. $M >> G$). The multiuser interference process thus becomes a discrete time finite Markov process. With small time increments ($\Delta t$), the bit-to-bit transitions of the state variable are characterized by the following one step transition probabilities, (with $\mu$ defined as $1/\overline{B}$).

$$P_{ij} = \text{Prob } \{m_k = \quad (1)$$

$$j/m_{k-1} = i\} = \begin{cases} i\mu\Delta T & \text{for } i = j + 1 \\ 1 - \lambda\Delta T - i\mu\Delta T & \text{for } i = j \\ \lambda\Delta T & \text{for } i = j - 1 \\ 0 & \text{Otherwise} \end{cases}$$

The success probability of an L bit packet, given that the interference vector is $(m_1, m_2, m_3 \ldots m_L)$, in terms of the previously defined fixed assigned CDMA functions, is given by $P_c(m_1) \cdot P_c(m_2) \ldots P_c(m_L)$. Hence the desired probability of packet success can be determined by averaging over the joint distribution of the L states, yielding $$P_S(\tau, \lambda, G) = \sum_m P_c(m_1) P_c(m_2) \ldots \quad (2)$$

$$P_c(m_L) \cdot p(m_1, m_2, \ldots m_L/\lambda, G)$$

At this point, the Markovian property is used to write the joint distribution of the $m_i$'s in (2) as $$p(m_1 \cdot m_2, m_3 \ldots m_L) = p(m_1)p(m_2/m_1)p(m_3/m_2) \ldots \quad (3)$$

$$p(m_L/m_{L-1})$$

Using this in (2), and grouping terms in $m_1$, $$P_S(\tau, \lambda, G) = \sum_{m_2, m_3 \ldots m_L} P_c(m_L)P_c(m_{L-1}) \ldots \quad (4)$$

$$P_c(m_2) \cdot p(m_L-1)p(m_{L-1}/m_{L-2}) \ldots p(m_3/m_2) \cdot$$

$$\{\Sigma P_c(m_1)p(m_2/m_1)p(m_1)\}$$

Denoting the term in brackets above as $f_2(m_2)$, the packet success probability can be written as $$P_S(\tau, \lambda, G) = \sum_{m_2, m_3 \ldots m_L} P_c(m_L)P_c(m_{L-1}) \ldots \quad (5)$$

$$P_c(m_2)p(m_L/m_{L-1})p(m_{L-1}/m_{L-2}) \ldots p(m_3/m_2) \cdot f_2(m_2)$$

Again grouping terms in $m_3$, the summation can be expressed as, $$P_S(\tau, \lambda, G) = \sum_{m_3, m_4 \ldots m_L} P_c(m_L)P_c(m_{L-1}) \ldots \quad (6)$$

$$P_c(m_3)p(m_L/m_{L-1})p(m_{L-1}/m_{L-2}) \ldots p(m_4/m_3) \cdot f_3(m_3)$$

where $f_3(m_3)$ is defined as, $$f_j(m_j) = \sum_{m_{j-1}} P_c(m_{j-1})p(m_j/m_{j-1})f_{j-1}(m_{j-1}) \quad (8)$$

In $f_{j-1}(m_{j-1})$ using the relation, $$f_j(m_j) = \sum_{m_{j-1}} P_c(m_{j-1})p(m_j/m_{j-1})f_{j-1}(m_{j-1}) \quad (8)$$

The function $f_j(m_j)$ can be identified as the probability of the system being in state $m_j$ during bit i without any bit errors having occurred during the preceding (i-1) bits. The packet error probability computation is completed by continuing the recursion until $f_L(m_L)$ is obtained. After finding $f_L(m_L)$, the packet success probability is determined as, $$P_S(\tau, \lambda, G) = \sum_{m_L} f_L(m_L)P_c(m_L) \quad (9)$$

Equation (9) establishes the basis for throughput, delay and stability analysis for asynchronous CDMA.

The stability analysis of asynchronous random access CDMA is analyzed using a "load line" approach (similar to that for slotted ALOHA); because it provides a good qualitative picture of channel behaviour. In the load line approach, the objective is to plot curves of input traffic volume ($S_{in}$) and output traffic volume $S_{out}$) as functions of total (composite) channel traffic G, with the terminal parameters N, $\lambda_a$ and $\lambda_r$ as parameters. For variable message length systems, this task is complicated by the fact that retransmission and new traffic have different message length distributions. To deal with this problem, a message flow equilibrium equation is defined for the system, from which the message length ($\bar{B}$) to composite channel traffic (G) relationship (feasible at equilibrium) is determined. In general, the global equilibrium points are the solutions of the simultaneous message and packet (data) flow equations. The message flow equation is based on the fact that the rate at which new messages enter the system is equal to the rate at which new and retransmitted messages (taken together) leave the system. From FIG. 2, it can be shown that the input rate for new messages is $(N-n)\lambda_a$. The message flow can be written as, $$(N - n)\lambda_a = \lambda \int_0^\infty b(\tau)P_S(\tau, \lambda, G)d\tau \quad (10)$$

where $\lambda = n\lambda_r + (N - n)\lambda_a$ and $G = \lambda B$.

In equation (10), the righthand side (RHS) is the rate at which composite messages (rate $\lambda$ and length distribution $b(\tau)$ leave the system i.e. are transmitted without packet error. Similarly, the packet or data flow equation (10) is based on the assumption that bits cannot accumulate within the system at equilibrium, so that the input traffic volume must equal the output traffic volume. Thus the packet flow equation is obtained by observing that the input data flow is $S_{in}=(N-n)\lambda_a A$, while the output data flow (or throughput, $S_{out}$) is given by integration over all possible composite message lengths $\tau$. This gives for the packet flow equation, $$(N - n)\lambda_a A = \lambda \int_0^\infty \tau b(\tau)P_S(\tau, \lambda, G)d\tau \quad (11)$$

with $\lambda = n\lambda_r + (N - n)\lambda_a$ and $G = \lambda B$.

Equations (10) and (11) are the system equilibrium equations in two unknowns, n and $\bar{B}$. The Global Systems equilibrium points (n*, B*) are determined as the simultaneous solution of the message and packet flow equilibrium equations. Systems with a single equilibrium point are classified as stable or saturated, while two stable equilibrium points indicate bistability. Stability is evaluated by direct solution of the two simultaneous nonlinear equilibrium equations. This is done graphically by plotting so-called message and packet flow equilibrium "contours" on the (n*, $\bar{B}$*) plane. However, a computationally simpler approach is to first determine the message flow equilibrium contour and then determine the LHS $S_{in}$ and RHS ($S_{out}$) of the packet flow equation (10) along that message flow equilibrium contour, which uniquely specifies an equilibrium relationship between the number of backlogged terminals, n (and hence composite traffic G) and message length $\bar{B}$. Points at which $S_{out}=S_{in}$ will then be identified as global system equilibrium points, with the $S_{out}$ curve the throughput and the $S_{in}$ curve the load line in the familiar load line stability model.

The above procedure can be implemented as follows. First, the composite arrival rate $\lambda$ and $S_{in}$ are related by:

$$S_{in} = \lambda A - n\lambda_r A \lambda - (G_o - S_{in})\alpha \quad (12)$$

where $\alpha \triangleq \lambda_r/\lambda_a$ and $G_o \triangleq N\lambda_a A$ (offered load) so that $$\lambda = [S_{in} + (G_o - S_{in}) \propto ]/A \triangleq f(S_{in}) \quad (13)$$

Hence, average composite message length $\bar{B}$ can be expressed in terms of G and $S_{in}$ as, $$B = G/\lambda = G/f(S_{in}), \quad (14)$$

so that $b(\tau)$, which is exponentially distributed by assumption, can also be expressed as a function of $\tau, G$, and $S_{in}$. Specifically, $\quad (15)$ -continued $$b(\tau) = \frac{1}{G/f(S_{in})} \cdot \exp\left[-\frac{\tau}{G/f(S_{in})}\right] \Delta \, g\left(\tau, \frac{G}{f(S_{in})}\right)$$

Substituting the above expressions for $\lambda$ and $b(\tau)$ in the message flow equation (10), the resulting message flow equilibrium relationship between $S_{in}$ and G can be obtained from $$S_{in} = f(S_{in})A \int_0^\infty g\left(\tau, \frac{G}{f(S_{in})}\right) P_S(\tau, f(S_{in}), G) d\tau \quad (16)$$

Numerical solution of $S_{in}$ in equation (16) for specified values of G gives the load line curve, along the message equilibrium contour. Each message equilibrium solution $(G^*, S_{in}^*)$, also relates the composite message arrival rate $\lambda$ to G since $\lambda^* = f(S_{in}^*)\Delta h(G^*)$. It can also be shown that the throughput curve (i.e. $S_{out}$ vs. G), from the RHS of the packet flow equation (11) is:

$$S_{out}^* = h(G^*) \int_0^\infty \tau \, G\left(\tau, \frac{G^*}{h(G^*)}\right) P_S(\tau, h(G^*), G^*) d\tau \quad (17)$$

Equation (17) gives the throughput (output data flow) at each of the message equilibrium $(G^*, S_{in}^*)$ pairs computed from equation (16). Equations (16) and (17) complete the performance evaluation of throughput, delay and stability of specific CDMA packet networks under consideration. The analytical model for throughput and stability shown above can be demonstrated by way of example in a Direct Sequence (DS) asynchronous CDMA system. It can be shown that the performance evaluation uses as its basis fixed assigned bit error probability functions, $P_B(m)$. For simplicity, approximate closed form expressions derived by others for random code sequences are used. Specifically, for a system with bandwidth expansion BW and M interfering users, the bit error rate formula is given by:

$$P_B(m) = 0.5 \, \text{erfc}(\sqrt{2BW/3M}) \quad (18)$$

For the numerical examples, the traffic model describes a system with a variable number of bursty interactive terminals (N), each generating $\lambda_a$ new messages per second. Each message is of variable length, described by an exponential distribution with mean $\overline{A}$ sec, corresponding to an average of L bits per message. In the examples given, L is taken to be 256 bits. With data transmission speed (before spreading) taken to be 9.6 Kbps, $\overline{A} = 0.0265$ secs, the quantity $G_0 = N\lambda_a A$, is a key parameter and is a measure of total new traffic load offered to the channel. The second important parameter is $\alpha$, the ratio of the effective retransmission rate $\lambda_r$ to the new transmission rate $\lambda_a$, i.e. $\alpha = \lambda_r/\lambda_a$. In general, for a given $G_0$, higher values of $\alpha$ will tend to move the system towards bistable behaviour. The load line stability analysis proceeds as follows: for a given choice of $G_0$ and $\alpha$, curves of $S_{out}$ (throughput) and $S_{in}$ (load line) are plotted as functions of total channel traffic G. Systems with multiple intersection points are identified as bistable, while those with exactly one intersection point are designated as stable. If for a given $G_0$, a specific value of $\alpha$ gives an unstable system, lower values of retransmission rate should be tried until a satisfactory level of stability is achieved.

Figure 3A:
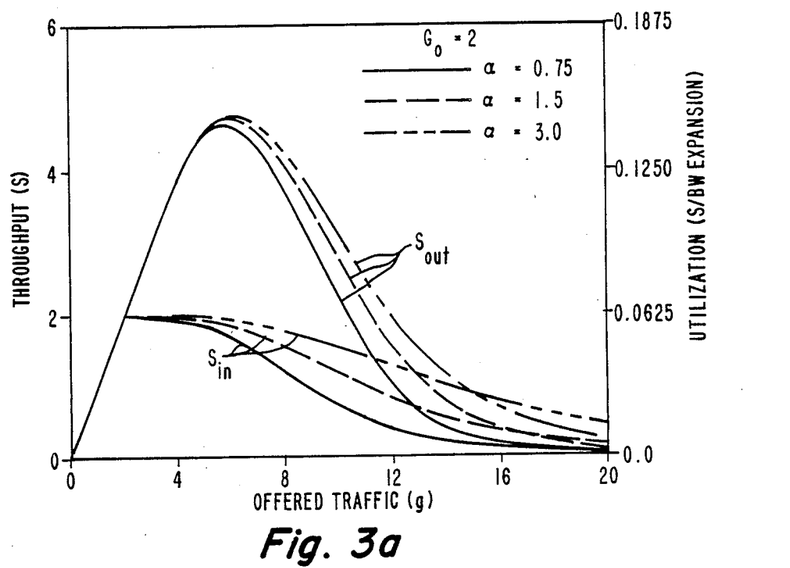
FIGS. 3a, 3b, 4a and 4b are charts illustrating the instability of asynchronous CDMA packet channels.
Figure 3B:
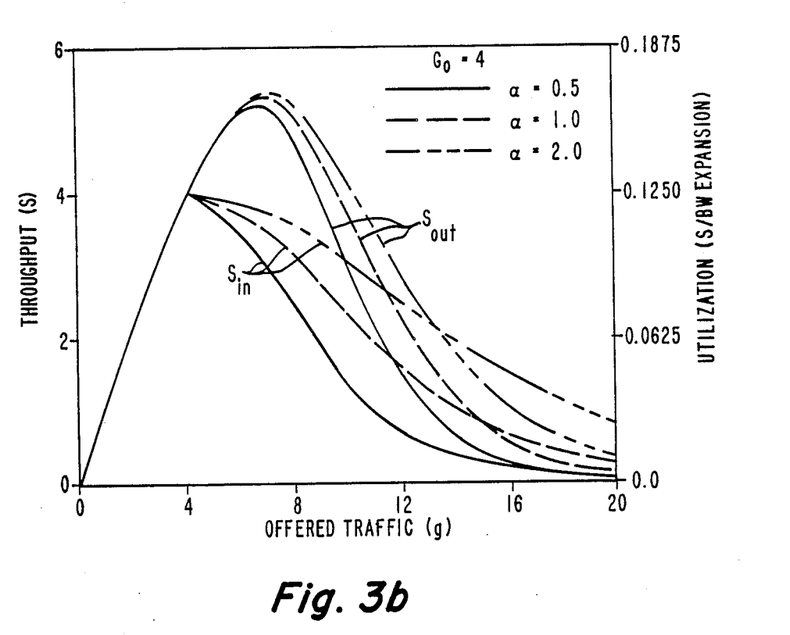

FIGS. 3a and 3b show throughput and load line curves for the DS-CDMA system of the example with bandwidth (BW) expansion BW=32. Two possible values of external channel loading $G_0 = 2.0$ and 4.0 (corresponding to light and heavy traffic respectively) are shown in respective FIGS. 3a and 3b. In each case, three possible choices of $\alpha$ are used to demonstrate the transition from bistability to unconditional stability. The throughput curve first increases with channel traffic G, reaches a maximum and then decreases, as in all random access systems. This is clearly to be expected here also because of the random access operation implicit in asynchronous CDMA. The difference is in the actual values of the throughput $(S_{out})$ achieved in each case, which is generally much higher than that of conventional ALOHA systems. Also, since CDMA systems can carry several simultaneous transmissions with good bit error rate, the maximum throughput can exceed unity; however, for a fair assessment of efficiency, the throughput is normalized in terms of the bandwidth expansion involved, so that a new quantity called utilization (defined as throughput/bandwidth expansion) is used for comparison purposes. Referring to FIGS. 3a and 3b, for each $\alpha$, load lines $S_{in}$ vs. G) are plotted, which for finite user systems, are monotonic decreasing functions of G. For familiar fixed packet size ALOHA systems, the equivalent load lines are straight lines with slope $-1/(\alpha-1)$. However, for all variable length systems, the load lines tend to be curves with decreasing negative slope, indicating the fact that the rate of reduction of the input traffic slows down as G increases due to corresponding increases in the mean length of retransmitted messages.

In FIGS. 3a and 3b, for the case $G_0 = 2.0$, use of $\alpha = 3.0$ clearly results in an unstable system since the $S_{out}$ and $S_{in}$ curves intersect first at $G \simeq 2$ and then at G $\simeq 14.5$. There is actually a third intersection point at higher G which is not shown so that the system is bistable when G 32 2.0 and $\alpha = 3.0$. The first and third equilibrium points can be shown to be stable by observing that the drift, i.e. $S_{out} - S_{in}$ (outflow from the system when displaced from equilibrium) is negative below and positive above the point of equilibrium. For the unstable point at G=14.5, $S_{out} - S_{in}$ is positive below G* and negative above G, so that a slight displacement from the point will send the system to either the equilibrium at low G or the one at high G, depending on the sense of the perturbation.

In FIG. 3a ($G_O = 2.0$), stability can be achieved by reducing $\alpha$ to 0.75, while the case with $\alpha = 1.5$ appears to be on the verge of instability. Similar effects are observed from FIG. 3b, which shows the heavier traffic case of $G_0 = 4.0$. In this case, even lower values of $\alpha$ are needed for stability since the load line curves now begin at a higher point (i.e. at $G = G_0$). Specifically, in this case, $\alpha = 0.5$ or lower is needed for unconditional stability. For a system with a single equilibrium point at $(G^*, S^*)$, the average delay d can be computed simply as $d = (G_0/S^* - 1)/\lambda_a$, so that throughput-delay characteristics are an automatic corollary of the stability analysis given here.

Figure 4A:
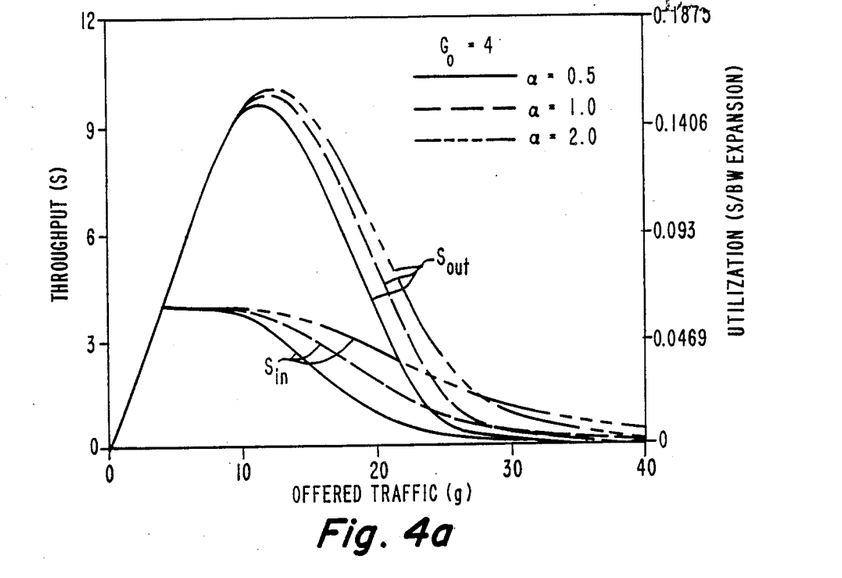
Figure 4B:
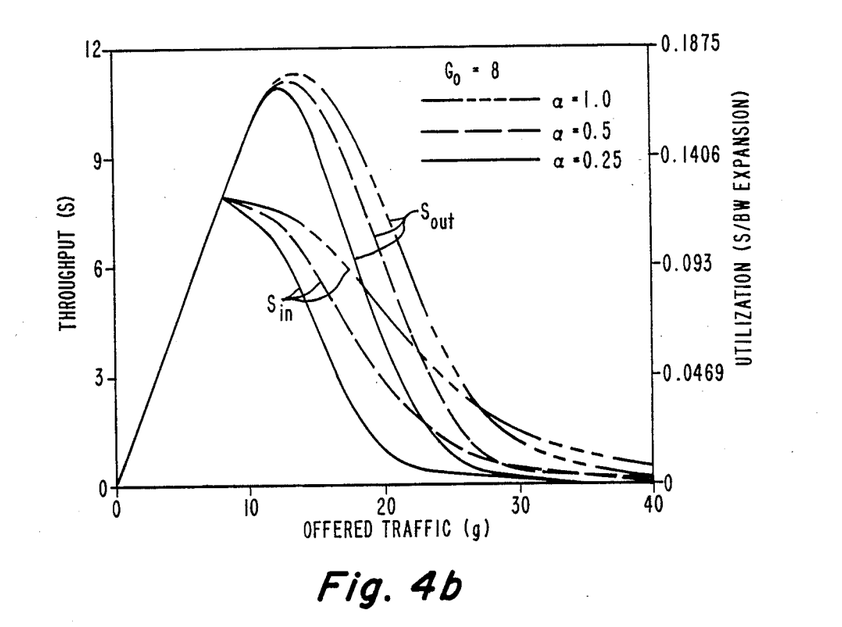

FIGS. 4a and 4b show similar results for the same DS-CDMA system with a higher bandwidth expansion, BW=64. Since this system has a greater ability to handle simultaneous transmissions, higher capacity (i.e.

maximum throughput) may be expected. However, significant increases in normalized capacity i.e., utilization are not expected to occur. The curves show that the maximum throughput for the BW=64 system is in the range of 9.5-11.25, while for BW=32, the range is 4.5-5.5. Thus, there is a near doubling of throughput as expected, and a slight improvement in normalized efficiency when the bandwidth expansion is doubled. The improvement in efficiency with increasing BW can be attributed to the fact that the peak to average ratio of the multiuser interference process is reduced as the average size of the system increases. The general qualitative behavior of the throughput and load line curves are similar to the previous case with BW=32. For similar levels of normalized offered load G (i.e. 4.0 instead of 2.0 and 8.0 instead of 4.0), lower values of $\alpha$ are required to avoid bistability conditions. In particular, for $G_0=4.0$, $\alpha$ of 0.5 or less is required, while for $G_0=8.0$, $\alpha$ of 0.25 or less is required. To see what these values of $\alpha$ imply for retransmission rate, for a system with 100 terminals and $G_0=4.0$, $\lambda_a$ can be computed as 1.5 messages/sec, so that required $\lambda_r$ becomes 0.75 messages/sec or an average delay of 1.33 sec. If the number of terminals is doubled to 200, the value of $\lambda_r$ drops to half the above value i.e. 0.375 messages/sec. Thus, as expected, the retransmission delay required for stability increases with the number of terminals in the system N. Note also that the penalty in average delay associated with using a low value of $\lambda_r$ is minimal in this CDMA example since $S \simeq G_0$.

Overall, some general observations can be made from FIGS. 3 and 4. First, asynchronous random access CDMA systems are potentially unstable, and, for a given set of traffic parameters (N, $\lambda_a$ and $\overline{A}$), can be stabilized by using a sufficiently high retransmission delay $T_r$ where $T_r=1/\lambda_r$. Second, maximum throughput increases with the spread spectrum bandwidth expansion.

An important fact is that while the $S_{out}$ curve for CDMA systems is almost linear wit $S_{out} \simeq G$, for G below the capacity region, after reaching the peak throughput, $S_{out}$ decreases at a more rapid rate than for ALOHA. For example, in the DS-CDMA systems of FIGS. 3 and 4, the throughput decreases to less than 10% of its maximum value when the channel is loaded to three times its capacity. In contrast, for ALOHA with exponential messages, the comparable decline is only of the order of 50%. The steepness with which the $S_{out}$ curves decline can be further accentuated when the average number of bits in a packet increases or when forward error correction (not considered here) is used. The faster rat of decline in $S_{out}$ is matched by a rapidly decreasing load line in order to avoid bistability. Thus, ensuring the stability of random access CDMA may be more critical than ensuring stability in ALOHA systems. This fact is not widely recognized, since CDMA systems are generally thought to degrade gradually. Actually, CDMA systems are characterized by little degradation in nominal performance (corresponding to the first equilibrium below capacity), since $S_{out} \simeq G$ in that region. However, the fact that nominal throughput and delay degrades gradually as channel load increases is almost deceptive, because additional equilibrium points may exist beyond capacity unless suitably long retransmission delay is used. On the other hand, use of the relatively long transmission delay required for stability does not involve significant average delay penalty, except at very high load.

In FIG. 5, system 10 is an unslotted asynchronous CDMA terminal. System 10 is one of a large number of similar systems located at spaced communication centers in which users asynchronously transmit and receive messages from an earth orbiting satellite. System 10 is of generally known design except for the implementation to the solution of the problem of providing a preset average delay to retransmissions to overcome the instability equilibrium points as discussed and as given by way of examples in FIGS. 3a and 3b and FIGS. 4a and 4b.

System 10 includes an antenna 12 and an RF subsystem 14. Antenna 12 and RF subsystem 14 are conventional and serve to receive and transmit RF communication signals to earth-orbiting satellite systems in a known way. These RF subsystems use conventional CDMA communication systems and further details need not be described herein.

Subsystem 14 is coupled to a CDMA duplex modem 16 which operates to modulate and demodulate the RF communication signal received from subsystem 14. The modem 16 includes all necessary circuitry for transmitting received data packets to the cyclic redundancy decoder (CRC) 18 and for receiving messages to be transmitted from transmit scheduler 21.

The CRC decoder 18 is a conventional system employed in packet communications for placing a parity check code on the packet signal. The terminal receives a message (which is generally of variable length) at its input buffer, headers are added, both for synchronization and identification and the CRC decoder 18 appends the CRC sequence for error detection. When the channel message thus received has been formatted, it is asynchronously transmitted using the assigned CDMA code.

The received message from the CRC 18 is applied to the verify system 20 which verifies that the received signal is, in fact, a correct signal as transmitted by subsystem 14. If the transmitted signal is determined to be correct by verify system 20, a clear buffer signal is applied to a single packet transmit buffer 22.

Buffer 22 receives new messages applied to it by the input data buffer 24. The input data buffer 24 and single packet transmit buffer 22 are conventional. Buffer 22 when loaded, generates a signal indicating the buffer is loaded, which signal is applied to buffer 24 to preclude transmitting a second packet while the buffer 22 is so loaded.

A transmit scheduler 21 to be described in connection with FIG. 6 applies the message to be transmitted to the duplex modem 16 for transmission through subsystem 14 to the receiving station. The receiving station, as known in CDMA, screens all incoming messages for its particular code on the transmitted message from system 10. Each packet code, as known, includes a header code which identifies a particular receiving station to which the message is being sent. Those receivers screen the incoming messages so as to process only those messages which are in fact destined for that receiving receiver.

When a new message is sent by the RF subsystem 14 to the orbiting satellite, it receives its own signal after a propagation delay. That signal is applied through modem 16 to the CRC decoder 18 and then to the verify system 20. The message is also simultaneously received by the destination as well as by the transmitter since the channel is of broadcast nature. Verify system 20 determines if the received message transmitted by subsystem 14 contains a CRC error. The verify system 20 indicates a region of poor bit error due to multiuser interference. If errors are detected, a fault signal is applied to transmit scheduler 21 which causes the message stored in buffer 22 to be retransmitted after a preset time delay set in accordance with the present invention. That time delay has an average value of between 0 and $T_r$ where $T_r$ is the reciprocal of $\lambda_r$ as discussed above. The process is repeated until the message is successfully received at the destination which is verified by verify system 20.

In FIG 6, the ready state 30 indicates that the system 10 of FIG. 5 is ready to transmit a new message. The state is controlled by a signal from a clear input buffer 32 in verify system 20, of FIG. 5. Signal transmit buffer 22, FIG. 5, transmits a new message received from buffer 24. The new message is then transmitted, transferred to the modem and transmission initiated, step 34 FIG. 6. After the transmission ends, the verify system 20, FIG. 5, waits for a delay of exactly one propagation step 37, FIG. 6, to receive the CRC decoded transmitted signal that was transmitted by scheduler 21 via subsystem 14. After the propagation delay, step 37, system 20 then verifies whether or not the transmission was successful. If it was successful, the clear input buffer step 32 implies a signal is applied by verify system 20 to the packet transmit buffer 22 to cause a new message to be stored in buffer 22 and then be transmitted.

If the transmission was not successful, then a failure signal is applied to the transmit scheduler 21. The scheduler 21 includes a random number generator which is set to generate a random number distributed over the range $0-2T_r$ seconds, step 36, FIG. 6. The value of $T_r$ is selected from the relationship of $\lambda_r = 1/T_r$ as discussed above. Recall that $\alpha$ is the ratio of $\lambda_r$ to $\lambda_a$.

Referring to FIGS. 3 and 4, the $\alpha$ is plotted at different ratios for given offered traffic (G) and the throughput plotted for that offered traffic. Different throughputs $G_0$ are selected for a given system and system bandwidth as indicated by way of example in FIGS. 3a, 3b, 4a and 4b. An $\alpha$ value is selected which results in a single equilibrium point of the plots of the $S_{in}$ and $S_{out}$. Generally, the lower the value of $\alpha$, the greater the possibility of a single equilibrium point. As shown in FIG. 3a, the $\alpha$ at 0.75 has a single equilibrium point whereas the higher values are unstable with two equilibrium points. In FIG. 3b, the $\alpha$ having a value of 0.5 has a single equilibrium point. Similarly, the lower values of $\alpha$ in FIGS. 4a and 4b also have a single equilibrium point. The equilibrium points are the points where the input traffic matches the output traffic (throughput of the system). By providing a single equilibrium point, instability in the system is precluded. That is, the backlogged retransmissions tend to regress to the point of equilibrium at instances of high retransmission rates. That single equilibrium point is the one at which the greatest throughput for a stable system occurs.

The retransmission of the unsuccessful message is assumed equivalent to a Poisson rate of $\lambda_r$ messages per second as discussed above. The rate $\lambda_r$ is equal to $1/T_r$ where $T_r$ is the average random delay of the retransmitted message. Thus, it is an easy matter to compute the average random delay $T_r$ for a given $\lambda_r$. For a given message rate, $\lambda_a$, the $\alpha$ is selected from the plotted $S_{in}$ vs. $S_{out}$ for a given offered traffic $G_0$. A given input message rate $\lambda_a$ and the retransmission rate $\lambda_r$ determine a given $\alpha$. These $\alpha$'s are plotted as shown in FIGS. 3a and 3b for different bandwidths and different offered traffics using the equations (16), (17) and (18) above.

Quantity $G_0$ as mentioned is a key parameter and is the measure of total new traffic load offered to the channel. Thus, different $G_0$'s and $\alpha$'s are selected and the curves $S_{out}$ and $S_{in}$ are plotted as functions of the total channel traffic G and the curves analyzed to produce an $\alpha$ of which there is but a single equilibrium point. The $\alpha$ for that single equilibrium point thus yields the value of the average $T_r$ for the retransmitted message in order to preclude the unstable second and subsequent equilibrium points.

For this reason, in step 36, FIG. 6, a random number generator, in scheduler 21, (FIG. 5) draws a number distributed over the range of $T_r$ having a value from 0 to $2T_r$ seconds. The value of $T_r$ is computed at step 39 for a given set of system parameters. Once a random number, step 36, is selected, an X second delay, step 38, is applied to the transmit message portion of the cycle which delays the retransmission of the signal by the selected delay X in accordance with the drawn random number. Thus, each retransmitted message applied to the modem 16 is automatically delayed by scheduler 21, FIG. 5, a random delay value in the range of 0 to $2T_r$ in accordance with the random selected number. What this means is that statistically the equilibrium point at unstable relatively high traffic volume is significantly avoided. While prior art systems may retransmit error messages at some finite delay relative to the previously transmitted message, such delay is generally insufficient on an average basis statistically to avoid instability and the resultant low throughput. This is because a relatively small retransmit delay was not known to cause instability.

The transmit scheduler 21, FIG. 5, is programmed with a given delay range for a given terminal based on the parameters of the requirements for that terminal. The delay necessarily may vary from terminal to terminal in a given system. Each terminal transmit scheduler is thus programmed accordingly to provide a random number in the given time delay range based on the computation of the delay essential for that terminal in accordance with its given traffic load. Observe in FIGS. 3 and 4 that as the offered traffic of volume increases $\alpha$ decreases. For offered traffic $G_0 = 2$, $\alpha$ for a single equilibrium point is 0.75 and where $G_0 = 8$, $\alpha$ is 0.25. In the different FIGS. 3 and 4, the low value of $\alpha$ occurs as $S_{in}$ and $S_{out}$ approach each other at high offered traffic but do not intersect. However, for the higher values of $\alpha$ the $S_{in}$ and $S_{out}$ curves intersect at a relatively higher equilibrium point indicating instability. The scheduler 21 is an apparatus normally used in ALOHA systems which are different than CDMA systems, except as modified to generate random numbers in a selected range as described above.

What is claimed is:

1. A method for transmitting information in a CDMA system, said method comprising:
    initially transmitting information in a code division multiple access channel;
    determining if said information has been correctly received;
    retransmitting said information with a selected time delay if said information has not been correctly received; and
    repeating said determining and retransmitting steps until said information is correctly received using different time delays, said different time delays being random in duration, but together having an average duration selected in accordance with the occupancy of said channel to provide a single stability mode.

2. The method of claim 1 wherein said retransmitting step comprises selecting a time delay which maintains an $\alpha$ having a single equilibrium point where $\alpha$ is the ratio of the effective retransmission rate $\lambda_r$ to the new transmission rate $\lambda_a$.

3. The method of claim 1 wherein said retransmission step comprises selecting the average time delay which causes a single point at which the channel traffic input load $S_{in}$ is the same as the channel throughput $S_{out}$.

4. A method for transmitting information in a CDMA system comprising:
receiving and transmitting a plurality of code division multiple access (CDMA) information signals;
placing an error check code in the transmitted signals;
selecting from the received signals those signals addressed to said terminal means;
determining if the transmitted signals are correctly transmitted;
transmitting a new signal if a given transmitted signal is incorrectly sent; and
retransmitting each transmitted signal with a time delay of selected duration after initial transmission if initially erroneously sent, such delays having their durations selected so as to provide an incoming-outgoing traffic load having a single equilibrium point.

5. The method of claim 4 wherein said retransmitting step includes receiving a new message, transmitting the new message after a given propagation delay for examining the propagation delayed signal for error, and in case of error in the propagated signal, delaying the transmission of that signal with said selected duration of delay.

6. Apparatus for transmitting information in a code information in a code division multiple access (CDMA) system comprising:
means for initially transmitting an information signal in a code division multiple access channel;
said means for transmitting including means for receiving said signal and means responsive to said received transmitted information signal for determining if the information in said received signal has been correctly received; and
means responsive to said means for determining for causing said means for transmitting to retransmit said information signal with a selected time delay if said information in said received signal has not been correctly received;
said means for transmitting including means for causing said means for determining and means for retransmitting to repeat until said information is correctly received using different time delays, said different time delays being random in duration, but together having an average duration selected in accordance with the occupancy of said channel to provide a single stability mode.

* * * * *